Jan. 23, 1962 F. J. ELLERT 3,018,383

ELECTRICAL MASTER SLAVE AMPLIFIER CIRCUIT
EMPLOYING SILICON CONTROLLED RECTIFIERS

Filed April 26, 1960 2 Sheets-Sheet 1

Inventor
Frederick J. Ellert
by Charles W Helzer
His Attorney

Inventor
Frederick J. Ellert
by Charles W Helzer
His Attorney

United States Patent Office 3,018,383

Patented Jan. 23, 1962

3,018,383

ELECTRICAL MASTER SLAVE AMPLIFIER CIRCUIT EMPLOYING SILICON CONTROLLED RECTIFIERS

Frederick J. Ellert, Scotia, N.Y., assignor to General Electric Company, a corporation of New York Filed Apr. 26, 1960, Ser. No. 24,763
5 Claims. (Cl. 307—88.5)

The present invention relates to a symmetrical slaving amplifier circuit employing silicon controlled rectifiers.

More particularly, the invention relates to a symmetrical amplifying circuit for slaving the action of a pair of controlled unidirectional conducting devices to a single-ended source of control signals.

In many industrial and military electronics control systems it is quite often necessary that two current controlling devices such as silicon controlled rectifiers be controlled from a single source of control signals. In many situations it is necessary that the devices being controlled from the single-ended source respond symmetrically. That is, they must respond alike during alternate half cycles of the alternating current supply by conducting for equal periods during the respective half cycles when they are enabled. For example, if the master current controlling device is set to conduct for a period from 30° phase angle to 180°, then the slave current controlling device must conduct for the equivalent period from 210° to 360° during its available conductive interval. Heretofore, to achieve such symmetrical operation of a pair of current controlling devices required the use of a number of precisely matched input control networks which complicated the circuit greatly.

It is therefore a primary object of the present invention to provide a new and improved symmetrical slaving circuit which is economical, compact and efficient in operation, and which eliminates the need for precisely matched input control networks.

In practicing the invention a symmetrical slaving circuit is provided which includes a master controlled unidirectional conducting device that has its gate element coupled to a single-ended source of electrical control signals. A load device is connected in series with the unidirectional conducting device and the series circuit thus formed is adapted to be connected across the terminals of the source of alternating current potential. A charging device, such as a saturable reactor is connected in paralel circuit relationship with the master controlled unidirectional conducting device and a slave unidirectional conducting device. The control gate element of the slave controlled unidirectional conducting device is operatively coupled to the charging device so that the charging device is charged to an energy level depending upon the period of time that the master controlled unidirectional conducting device is not conducting during one half cycle of the alternating current supply, and the charging device holds off the firing of the slave controlled unidirectional conducting device for an equal period of time during the remaining half cycle of the alternating current supply.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
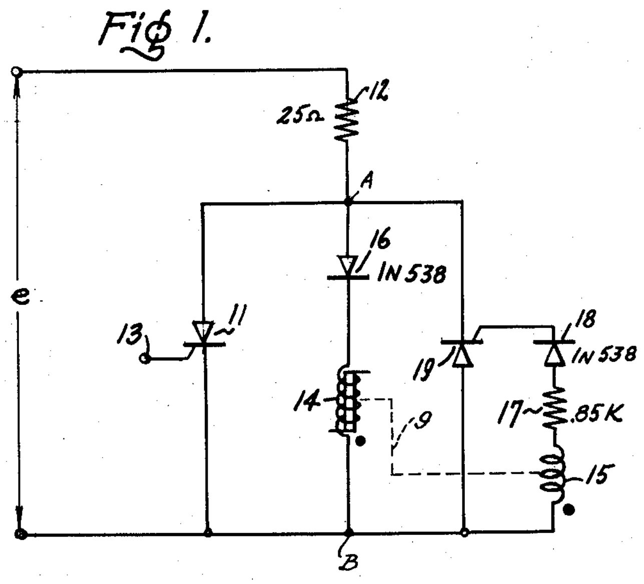
FIGURE 1 is a schematic circuit diagram of a new and improved symmetrical master slave amplifier circuit constructed in accordance with the invention.

The embodiment of the invention shown in FIGURE 1 of the drawings includes a master silicon controlled rectifier 11 of the type which is manufactured by the General Electric Company, and is available commercially from that company. The controlled rectifier is essentially a PNPN semiconductor consisting of three rectifying junctions which can be rendered conductive when full voltage is applied thereacross by the application of a low level gate-cathode current supplied to its gate control element. The silicon controlled rectifier is a solid state version of the grid control gaseous thyratron in that after it has been rendered conductive it remains conducting until the anode cathode potential is reduced below some predetermined critical value to return the device to its current blocking condition. This is of course accomplished by reducing the supply voltage to zero, as occurs twice in every cycle of an alternating current supply, and this is sufficient for the control rectifier to regain its blocking condition. The silicon controlled rectifier 11 is connected in series circuit relationship with a load device 12, and the series circuit thus comprised is adapted to be connected across a source of alternating current potential. A single-ended source of control signals (not shown) is connected to the input terminal 13 which is connected to the gate control element of the controlled rectifier 11, and the nature of this control signal will determine the point at which the controlled rectifier 11 will be rendered conductive during the half cycle of alternating current supply when a positive potential is applied to the anode element of the controlled rectifier 11. Connected in parallel circuit relationship with the controlled rectifier 11 is a series circuit comprised by the primary winding 14 of a saturable core reactor and an isolating diode 16. The primary winding 14 is inductively coupled (as shown by the broken line 9) with a secondary winding 15 of the saturable reactor which is connected in the gate control circuit of a slave controlled rectifier 19. By this arrangement when the master controlled rectifier 11 is nonconducting, essentially the full value of the alternating current supply potential is applied across its terminals A, B, which will cause a resetting current to flow through the diode 16 and primary winding 14. The secondary winding 15 of the saturable core reactor is connected through a limiting resistor 17, and an isolating diode 18 to the gate control element of a slave silicon controlled rectifier 19. The slave silicon controlled rectifier 19 is connected in parallel circuit relationship with the primary winding 14 of the saturable core reactor and its isolating diode 16, and in parallel circuit relationship with the master controlled rectifier 11.

The circuit of FIGURE 1 operates in the following manner to accomplish a symmetrical supply of load current through the load device 12. The voltage-time characteristic curve for the circuit of FIGURE 1 is not illustrated, however the characteristic curve shown in FIGURE 3 would be applicable if one imagines that the voltage wave shape shown were transposed so that during the first half cycle from time $t0$ to time $t2$ the voltage was positive going, and during the second half cycle from time $t_2$ to time $t_0$ the voltage wave shape were negative going. Considering the circuit of FIGURE 1 during the positive half cycle of the alternating current supply when the terminal A is positive and the terminal B is negative prior to the control signal rendering the master controlled rectifier 11 conductive, essentially the full voltage from the alternating current supply source will be across the diode 16 and the primary winding 14 of the saturable reactor. Under these conditions, the diode 16 will conduct current that flows through the primary winding 14 and results in resetting the degree of magnetization of the saturable core of this winding from its positive saturation condition indicated at the point $\phi_s$ in FIGURE 2 of the drawings down the left side of the hysteresis curve to some intermediate point such as illustrated at $\phi_1$. This resetting action will continue over the period from time $t0$ to time $t1$ at which point the control signal renders the master controlled rectifier 11 conductive. Since the forward resistance of the controlled rectifier 11 when it is conducting is essentially zero essentially no voltage will appear across the winding 14 and no further resetting of the core 14 will take place. Essentially all load current will flow through the rectifier 11 and will appear across the load 12 as that segment of the curve occurring between times $t1$ and $t2$. Upon the alternating current supply voltage passing through zero, conduction through the controlled rectifier 11 will be discontinued, and the rectifier will reassume its blocking condition. Thereafter, during the negative half cycle of the alternating current supply when the terminal B is positive and the terminal A is negative no current can flow through the branches including the master controlled rectifier 11 and the isolating diode 16 since reverse voltages are applied to these devices. However, the positive potential at the terminal B will enable the slave controlled rectifier 19 due to the fact that the polarities of the alternating current potential now make it possible for this device to become conductive. However, the core of the saturable reactor 14, 15 will hold off firing of the slave controlled rectifier 19 for a period of time required for the potential at point B to drive the magnetization of the core of the reactor back up the right side of the hysteresis curve of FIGURE 3 from the point $\phi_1$ to the saturation point $\phi_s$. The time required for this operation will be equal to the time that was used in resetting the core of the saturable reactor to the point $\phi_1$ and will occur from time $t2$ to time $t3$. Thereafter, upon the core saturating, current will be conducted through the load winding 15, limiting resistor 17, and isolating diode 18 to fire the slave controlled rectifier 19. This will occur essentially at time $t3$ so that the portion of the characteristic curve occurring between time $t3$ and time $t0$ represents the portions of time that load current will be drawn through the slave controlled rectifier 19 and load device 12. From a comparison of the times $t_1$ to $t_2$, and $t_3$ to $t_0$ it can be appreciated that the master and slave controlled rectifiers 11 and 19 conduct for equal periods of time during the intervals that they are enabled by the alternating current supply potential, and hence that the load current supplied to the load device 12 is symmetrical. This is accomplished without requiring any precision matched control networks for supplying timing and gating pulses to the slave controlled rectifier 19. Hence, it can be appreciated that the circuit makes available a compact, economical, and efficient slaving circuit arrangement wherein symmetrical operation is obtained with a single-ended control source. It is of course possible to add additional circuits slaved to the master controlled rectifier in a similar manner; however, since the techniques to be used in such an arrangement are obvious extensions of the teachings of the present invention, such circuit modifications have not been disclosed.

Figure 4:
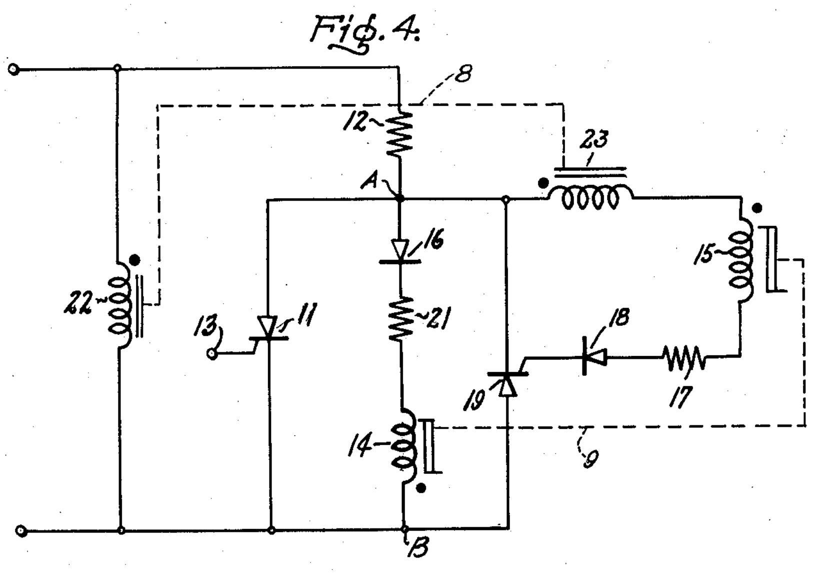
FIGURE 4 is a schematic circuit diagram of a second embodiment of a symmetrical master-slave amplifier circuit constructed in accordance with the invention.

Because the circuit arrangement of FIGURE 1 requires that full line voltage be supplied across the saturable core reactor 14, it is necessary that a relatively large and expensive saturable core reactor 14 be provided which is capable of withstanding the full line voltage of the alternating current supply source. In order that a smaller and less expensive saturable core reactor be used, the circuit arrangement of FIGURE 4 was devised. The circuit arrangement of FIGURE 4 includes a master controlled rectifier 11 having a gate control element connected through the terminal 13 to a single-ended source of control signals (not shown). The master controlled rectifier 11 is connected in series circuit relationship with the load 12 across a source of alternating current supply potential. The master controlled rectifier 11 is also connected in parallel circuit relationship with a series circuit comprised by the primary winding 14 of a saturable core reactor, a limiting resistor 21 and isolating diode 16 connected between the juncture of the master controlled rectifier 11 and load 12 and one side of the alternating current supply. Primary winding 14 of the saturable core reactor is inductively coupled (as shown by the broken line 9) to a secondary winding 15 that is connected in series circuit relationship with a limiting resistor 17 and isolating diode 18 to the gate control element of a slave controlled rectifier 19. The slave controlled rectifier 19 is connected in parallel circuit relationship with the primary winding 14, limiting resistor 21 and isolating diode 16 in series, and in parallel circuit relationship with the master controlled rectifier 11. As thus far described, the circuit of FIGURE 4 is identical to that of FIGURE 1. The circuits differ however in that a transformer is provided in the arrangement of FIGURE 4 whose primary winding 22 is adapted to be connected across the terminals of the alternating current supply source in parallel with the load 12 and master controlled rectifier 11. The primary winding 22 of the transformer is inductively coupled (as shown by the broken line 8) to the secondary winding 23 that is connected in series circuit relationship with the secondary winding 15 of the saturable core reactor, and through the limiting resistor 17 and isolating diode 18 to the gate control element of the slave controlled rectifier 19. By this arrangement, it is possible to transform the firing current supplied to the gate control element of the slave controlled rectifier 19 by the transformer 22, 23 which constitutes a step-down transformer thereby allowing a much smaller and less expensive saturable reactor 14, 15 to be used in the circuit. In other respects, the circuit operates in a manner similar to the circuit arrangement shown in FIGURE 1 to effect symmetrical supply of load current through the load device 12.

Figure 3:
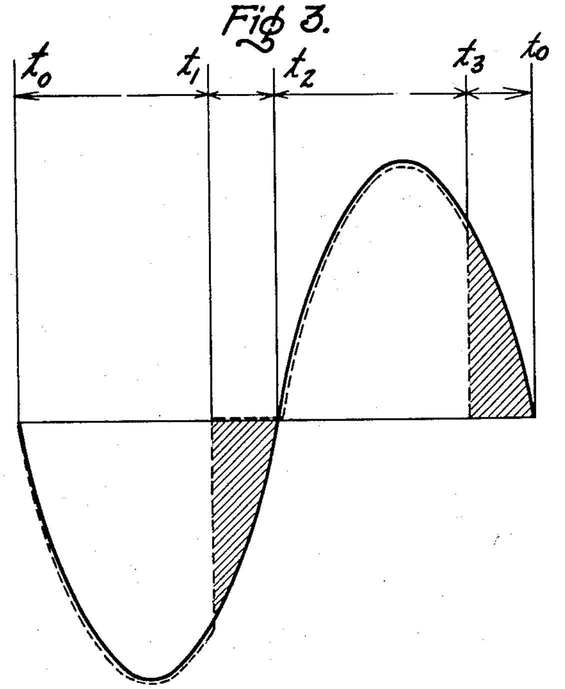
FIGURE 3 is a voltage versus time characteristic curve of the circuit shown in FIGURE 1.

In operation, the alternating current supply potential applied across the points A and B with the point A being positive prior to the master controlled rectifier 11 being rendered conductive causes a core resetting current to flow through the primary winding 14 of the saturable core reactor. This current will reset the magnetization of the core of the saturable core reactor down the hysteresis curve to a new point such as indicated at $\phi_1$ for the period of time extending from $t_0$ to time $t_1$ on the characteristic curve shown in FIGURE 3. The characteristic curve of FIGURE 3 is similar to the voltage appearing across the transformer secondary winding 23 with the exception that it is in reverse polarity to the polarity of the potentials appearing across the terminals A and B. Accordingly, during the positive half cycle of the alternating current voltage when the terminal A is positive the transformer secondary winding 23 will be negative at the no dot end, and hence will not tend to fire the slave controlled rectifier 19 during the core resetting action described above. At time $t_1$ upon the occurrence of the gating pulse from the single-ended source of control signals connected to the terminal 13, the master controlled rectifier 11 is rendered conductive. Since the forward resistance of the controlled rectifier 11 during conduction is essentially zero, the full available potential will appear across the load 12 and resetting of the core of the saturable reactor 14, 15 will stop at the intermediate point $\phi_1$. Thereafter, upon the alternating current supply potential passing through its current zero, the master controlled rectifier 11 will return to its blocking condition. During the next succeeding half cycle the transformer voltage appearing across the secondary winding 23 will be positive in polarity at the no dot end at the same time that the terminal B is rendered positive by the alternating current supply potential. However, the transformed voltage appearing across the transformer secondary winding 23 will be unable to fire the slave controlled rectifier 19 due to the fact that the potential appearing across the secondary winding 15 of the saturable core reactor will cancel out this potential for the period from time $t_2$ to $t_3$ until the magnetization of the core of the reactor winding 15 is returned from the point $\phi_1$ back up its hysteresis curve to saturation at $\phi_s$. Upon reaching saturation, the positive potential appearing across the transformer secondary winding 23 will be applied through diode 18 to the gate control element of the slave controlled rectifier 19 rendering this controlled rectifier conductive for the remainder of the half cycle of the alternating current supply potential. From an examination of FIGURE 3 of the drawings, it can be appreciated for the periods from time $t1$ to $t2$ and $t3$ to $t0$ the alternating current potential from the supply source is across the load 12 and that the time periods and magnitudes of these potentials are identical. Accordingly, it can be appreciated that the circuit operates as a symmetrical amplifier wherein symmetrical operation is obtained by slaving the action of a slave controlled rectifier to a master controlled rectifier through the medium of the saturable reactor. In the circuit design of FIGURE 4 this saturable reactor may be considerably smaller than that described in FIGURE 1 in that the step-down transformer 22, 23 allows the reactor to operate at much lower potentials.

Figure 5:
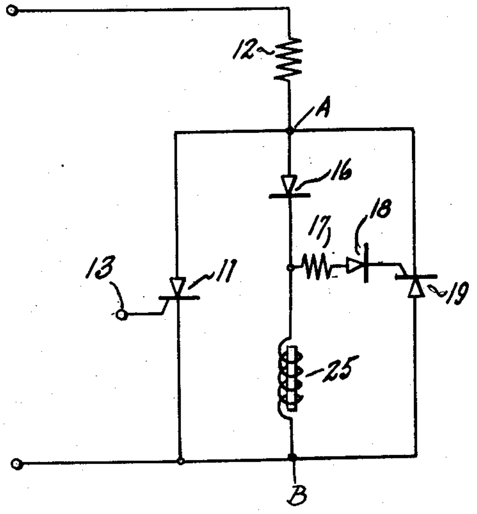
FIGURE 5 is a schematic circuit diagram of still a third form of symmetrical master-slave amplifier circuit made possible by the invention.

Still a third form of symmetrical master-slave amplifier circuit constructed in accordance with the invention is shown in FIGURE 5 of the drawings. The circuit arrangement of FIGURE 5 is designed as an economical symmetrical master-slave rectifier which does not require any transformer but employs instead only a single saturable core inductance as a charging element. The circuit of FIGURE 5 is comprised by a master controlled rectifier 11 having its gate control element connected through a terminal 13 to a single-ended source of control signals. The master controlled rectifier 11 is also connected in series circuit relationship with a load device 12 across a source of alternating current supply potential. Connected in parallel circuit relationship with the master controlled rectifier 11 is a series circuit comprised by an isolating diode 16 and a saturable inductor 25. Connected in parallel circuit relationship with this series circuit is a slave controlled rectifier 19 whose gate control element is connected through a limiting resistor 17 and isolating diode 18 to the junction of the diode 16 and the saturable inductor 25.

Figure 2:
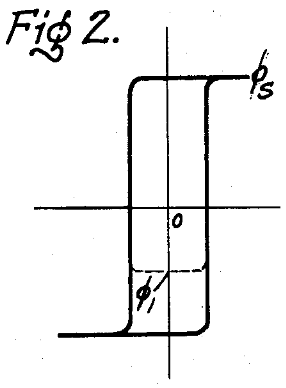
FIGURE 2 is the hysteresis graph of a saturable core such as that employed as an element in the circuit of FIGURE 1, and illustrates the manner in which the core is reset to some intermediate degree of magnetization to effect control of the circuit.

The circuit thus comprised operates in a fashion similar to the previously described circuits to develop a symmetrical output across the load device 12. In operation, it can be imagined that the characteristic curve shown in FIGURE 3 of the drawings is applicable to the circuit of FIGURE 5 if the first half cycle of the voltage wave shape shown occurring from time $t_0$ to $t_2$ is given a positive polarity, and the next succeeding half cycle is given negative polarity. Accordingly, during the half cycle of the alternating current supply when the terminal A is positive, and prior to the master controlled rectifier 11 being rendered conductive by the single-ended source of control signals, current through the diode 16 will tend to draw a resetting current through the saturable inductor 25 which will result in resetting the core of this inductor from its saturation condition down on the hysteresis curve to some intermediate point such as $\phi_1$ as shown in FIGURE 2 of the drawings. Upon the master controlled rectifier 11 being rendered conductive by the single-ended source of control signals, essentially the full remaining potential will appear across the load 12 so that resetting of the core of the saturable inductor 25 will cease. This occurs at time $t_1$, and for the remaining of the positive half cycle of the alternating current supply load current will be supplied to load 12. Upon passing through a current zero, the master controlled rectifier 11 will again assume its blocking condition, and the load current will cease. During the next half cycle the terminal B of the circuit will be rendered positive, and will cause a current to flow through the diode 18 and gate control element of the slave controlled rectifier 19 which will be of a magnitude sufficient to cause the core of the saturable inductor 25 to set back up its hysteresis curve. This setting current will occur over the time period $t2$ to $t3$ at which point the core reaches saturation, and the positive potential supplied from the alternating current source will be applied to the gate control element of the slave controlled rectifier 19 thereby rendering the slave rectifier 19 conductive. Upon this occurrence, and for the remainder of the cycle, the full output potentials will appear across the load 12 from the time period $t_3$ to $t_0$. From a comparison of the two time periods $t_1$ to $t_2$ and $t_3$ to $t_0$, it can be appreciated that equal load currents will be supplied through the load so that symmetrical operation of the circuit is achieved.

From the foregoing description, it can be appreciated that the invention provides a new and improved symmetrical slaving circuit which is economical, compact, efficient in operation and which eliminates the need for separate precision matched control networks to accomplish symmetrical operation where there is available only a single-ended source of control.

Having described several embodiments of a symmetrical master slave amplifier constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A symmetrical slaving circuit including in combination a master controlled unidirectional conducting device having a control gate element coupled to a single-ended source of electric control signals, a load device connected in series circuit relationship with said master controlled unidirectional conducting device with the series circuit thus formed being adapted to be connected across the terminals of a source of alternating current potential, a charging device connected in parallel circuit relationship with said master controlled unidirectional conducting device, and at least one slave controlled unidirectional conducting device connected in parallel circuit relationship with said charging device and in circuit relationship with a load device and having a control gate element operatively coupled to the charging device whereby said charging device is charged to an energy level dependent upon the period of time that the master controlled unidirectional conducting device is nonconducting during one-half cycle of the alternating current supply and the charging device holds off firing of the slave controlled unidirectional conducting device for an equal period of the remaining half cycle of the alternating current supply.

2. The combination set forth in claim 1 wherein said charging device comprises a saturable reactor having inductively coupled primary and secondary windings with the primary winding being connected in parallel circuit relationship with the master controlled rectifier and with the secondary winding being connected to the control gate element of the slave controlled rectifier.

3. A symmetrical slaving circuit including in combination a master silicon controlled rectifier having a control gate element coupled to a single-ended source of electric control signals, a load device connected in series circuit relationship with said master controlled rectifier with the series circuit thus formed being adapted to be connected across the terminals of a source of alternating current potential, a saturable reactor having inductively coupled primary and secondary windings with the primary winding being connected with an isolating diode rectifier across said master controlled rectifier in parallel circuit relationship with said master controlled rectifier, and a slave controlled rectifier connected in parallel circuit relationship with the primary winding of said saturable reactor and having a control gate element connected through an isolating diode and current limiting resistor to the secondary winding of said saturable reactor.

4. The combination set forth in claim 3 further characterized by a step down transformer having inductively coupled primary and secondary windings with the primary winding being adapted to be connected across the terminals of the alternating current supply and with the secondary winding being connected in series circuit relationship with the secondary winding of said saturable reactor to the control gate element of the slave controlled rectifier.

5. A symmetrical slaving circuit including in combination a master silicon controlled rectifier having a control gate element coupled to a single-ended source of control signals, a load device connected in series circuit relationship with said master controlled rectifier, the series circuit thus formed being adapted to be connected across the terminals of an alternating current supply, a single winding saturable reactor connected through an isolating diode in parallel circuit relationship with the master controlled rectifier, and a slave controlled rectifier connected in parallel circuit relationship with the saturable reactor and having a control gate element connected through a current limiting resistor and an isolating diode to the saturable reactor.

References Cited in the file of this patent

UNITED STATES PATENTS 2,757,297 Evans et al. ............ July 31, 1956
2,920,240 Macklem ............ Jan. 5, 1960